(12) United States Patent
Reid

(10) Patent No.: US 6,975,839 B2
(45) Date of Patent: Dec. 13, 2005

(54) APPARATUS, AND ASSOCIATED METHOD, FOR ESTIMATING FREQUENCY OFFSET USING FILTERED, DOWN-SAMPLED LIKELIHOOD POLYNOMIALS

(75) Inventor: Anthony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 575 days.

(21) Appl. No.: 10/247,414

(22) Filed: Sep. 19, 2002

(65) Prior Publication Data

US 2004/0087313 A1    May 6, 2004

(51) Int. Cl.[7] ................................ H04B 1/40
(52) U.S. Cl. ................ 455/75; 455/70; 455/71; 455/255; 455/256; 455/257; 375/341; 375/340; 375/350
(58) Field of Search ............... 455/70, 71, 75, 455/260, 265, 255, 256, 257; 375/341, 340, 375/350

(56) References Cited

U.S. PATENT DOCUMENTS

| | | | | |
|---|---|---|---|---|
| 5,349,607 A | * | 9/1994 | Moreno | 375/341 |
| 5,710,792 A | * | 1/1998 | Fukawa et al. | 375/229 |
| 6,353,642 B1 | * | 3/2002 | Asahara et al. | 375/344 |
| 6,389,040 B1 | * | 5/2002 | Viswanathan | 370/480 |
| 2002/0126618 A1 | * | 9/2002 | Kim | 370/208 |

* cited by examiner

Primary Examiner—Lee Nguyen
Assistant Examiner—Minh D. Dao

(57) ABSTRACT

Apparatus, and an associated method, for facilitating frequency offset estimation between communication stations operable in a communication system. A likelihood polynomial is calculated and provided to a filter. The filter forms a filtered representation of the likelihood polynomial, and the filtered representations are down-sampled by a decimator. A sampled, filtered representation of the likelihood polynomial is thereby obtained. The filtered, sampled representation is applied to a root calculator that calculates the roots of the polynomial, thereafter, to be used to compensate for the frequency offset.

20 Claims, 4 Drawing Sheets

APPARATUS, AND ASSOCIATED METHOD, FOR ESTIMATING FREQUENCY OFFSET USING FILTERED, DOWN-SAMPLED LIKELIHOOD POLYNOMIALS

The present invention relates generally to a manner by which to estimate a frequency offset between communication stations of a communication system, such as between a base transceiver station and a mobile station of a cellular communication system. More particularly, the present invention relates to apparatus, and an associated method, by which to estimate the frequency offset, and use the estimate to perform automatic frequency control (AFC) operations. A filter filters values representative of the received data. And, the filtered values are sampled by a decimator. Root calculation is performed upon the sampled values. Because root calculation is performed upon the data only after filtering and sampling operations are performed, the complexity of computations required to be performed to compute the roots of a likelihood polynomial, used in the estimation of the frequency offset, is significantly reduced.

BACKGROUND OF THE INVENTION

The need to communicate telephonically is an endemic part of modern society. Communication of voice, as well as other, data is effectuated by way of telephonic communication systems.

Telephonic communications are effectuable, for instance, by way of a wireless communication system. A wireless communication system advantageously obviates the need of wireline connections to interconnect the communication stations between which data is to be communicated. The use of a wireless communication system is advantageous, for example, when the use of a conventional, wireline communication system would be inconvenient or impractical. And, the installation costs associated with the installation of a radio communication system are generally less than the costs required to install the infrastructure of a wireline communication system.

A cellular communication system is an exemplary radio communication system. Telephonic communications are effectuable by way of a cellular communication system. Cellular communication systems have been installed throughout significant parts of the populated portions of the world, and use of cellular communication systems to communicate telephonically therethrough have achieved wide levels of usage. Various cellular communication standards have been promulgated, setting forth the operational parameters of different types of cellular communication systems. Successive generations of communication-system standards have been promulgated.

In a cellular communication system, a fixed network infrastructure is installed throughout a geographical area. Mobile stations positioned within the geographical area are generally able to communicate with the network infrastructure. The fixed network infrastructure includes fixed-site, base transceiver stations with which a mobile station communicates. Each base transceiver station defines an area, referred to as a cell, from which the cellular communication system derives its name.

A mobile station, also formed of a transceiver, is usually of dimensions to permit its carriage by a user. Use of the cellular communication system is permitted, typically, pursuant to a service subscription. And, a user, referred to as a subscriber, communicates by way of the cellular communication system through utilization of a mobile station.

Because radio channels are utilized to interconnect a base transceiver station and a mobile station, oscillators are utilized at the respective transceivers to convert data that is to be communicated during operation of the communication station upon the radio channels. Relative frequency drift of the oscillators of the respective transceivers, both short-term and long-term drift, cause the respective transceivers to operate at frequencies offset to one another. Frequency control schemes, including automatic frequency controls (AFC) schemes, have been developed and are regularly utilized in many different types of radio communication systems. Some frequency control schemes use a feed-back control mechanism by which to maintain the oscillators of the separate communication stations in frequency synchronization with one another. Other frequency control schemes form open-loop schemes that compensate for the relative frequency offsets.

Technical advancements in communication technologies have permitted the development of modulation schemes that utilize higher-density constellations, sampled at higher sampling rates. The need to maintain frequency control between communication stations, such as a base transceiver station and a mobile station, is of even greater significance because of the higher-density constellation that is used and the higher sampling rate at which received data is sampled. Greater channel dispersion occurs, and increasingly complex detection problems result. Relative, time-varying frequency offsets between the communication stations result in relative constellation rotations of the constellation sets from which the symbols forming the data that is communicated are members. And, such frequency offset degrades the ability of a receiving station correctly to recover the informational content of the communicated data.

The computing complexity of some existing frequency control schemes quickly become impractical as the number of symbols used to compute frequency offset increases. For instance, maximum likelihood estimation (MLE), frequency offset algorithms are used to compute roots of a likelihood polynomial to obtain frequency offset values.

In an exemplary cellular communication system operable pursuant to a GSM/EDGE (global system for mobile communication/enhanced data for GSM evolution) provides for the generation as transmission of training symbol bursts. Conventional MLE root-computation operations to determine the roots of a likelihood polynomial responsive to reception of such training sequences is impractically difficult to compute at the required sampling rates. Therefore, an improved manner by which to facilitate estimation of frequency offsets between communication stations operable in a communication system, such as a cellular communication system operable pursuant to a GSM/EDGE operational protocol, is needed.

It is in light of this background information related to frequency control in a communication system that the significant improvements of the present invention have evolved.

SUMMARY OF THE INVENTION

The present invention, accordingly, advantageously provides apparatus, and an associated method, by which to estimate a frequency offset between communication stations of a communication system, such as between a base transceiver station and a mobile station of a cellular communication system operable pursuant to a GSM/EDGE (global system for mobile communications/enhanced data for GSM evolution) operating protocol.

Through operation of an embodiment of the present invention, a manner is provided by which to estimate the frequency offset, and use the estimate to perform automatic frequency control operations.

The complexity of the computations required to be performed to compute roots of a likelihood polynomial, used in the estimation of the frequency offset is significantly reduced relative to conventional manners by which the roots of the likelihood polynomial are calculated. And, while reducing the complexity of the required computations, the accuracy of the computations are improved relative to conventional shortcuts taken to reduce the computational complexities of the computations of the polynomial roots.

In one aspect of the present invention, a filter is provided with the values representative of data received at a communication station. The data is filtered to form a filtered representation of the data. And, once filtered, the filtered data is sampled to form a sampled representation of the filtered data. Once the data is both filtered and sampled, the data is applied to a root calculator that calculates the roots of a polynomial equation formed of the filtered, sampled data. Because the polynomial expression that is applied to the root calculator is filtered and sampled prior to application to the root calculator, the computational complexity of the computations required to be performed by the root calculator to obtain root values used in the frequency offset estimation process is significantly reduced relative to conventional root calculation computations.

In another aspect of the present invention, the representations of the data applied to the filter form values representative of a likelihood polynomial. The values are filtered to suppress out higher-frequency components of the likelihood polynomial. Selection of the filter characteristics advantageously takes into account knowledge that the frequency offset is a value much smaller than the bandwidth of a typical cellular system and that the time-varying frequency offset shall be within a range of offsets.

The filter used to filter the values of the computed, likelihood polynomial is, in one implementation, a linear filter that forms a filtered representation of the values of the likelihood polynomial that is linearly related to the values of the likelihood polynomial provided thereto. Alternately, the filter can be a non-linear filter, operable to form a filtered representation that is nonlinearly related to the values of the likelihood polynomial provided thereto.

In another aspect of the present invention, the sampling performed upon the filtered representation of the values of the likelihood polynomial is performed by a decimator. The decimator operates to decimate, i.e., down-sample, values of the filtered representation of the computed, likelihood polynomial. By performing the down-sampling by the decimator, the quantity of values upon which subsequent root calculation operations are performed are sharply reduced.

In another aspect of the present invention, a root calculator is coupled to receive values of the sampled, filtered representations of the likelihood polynomial, representative of the received data. The root calculator calculates values of the roots of the likelihood polynomial. And, once the roots are calculated, minimization operations are performed to select an appropriate root of the likelihood polynomial and, therefrom, estimate a frequency offset value. Once the frequency offset is estimated, appropriate frequency control is effectuated.

In another aspect of the present invention, a value of the estimated frequency offset is applied to a derotator. Values of the data received at the communication station, suitably delayed, are also applied to the derotator. The derotator operates to rotate the symbols of the data, i.e., alter the frequencies thereof, by the derotator. Thereby, the derotator operates to control the frequency of the received data. Frequency control, to compensate for the frequency offset of the received data is thereby effectuated.

In one implementation, estimation of the frequency offset in a GSM/EDGE (global system for mobile communication/enhanced data for GSM evolution) that utilizes a PSK (phase shift keying) modulation scheme. Training sequences are sent by a base transceiver station of the communication system to a mobile station. And, the mobile station utilizes the training sequences to compute an estimation of a frequency offset between the frequency at which the mobile station and at which the mobile station are operable. The training sequences are formed of 26 training symbols. The mobile station incorporates an embodiment of the present invention and thereby provides a manner by which to reduce the complexity of computations required to obtain the frequency offset estimate. Once the frequency offset estimate is made, derotating functions are performed to compensate for the estimated frequency offset. Representations of received data forming a likelihood polynomial are provided to a filter that filters the values of the polynomial and thereafter to a sampler that samples values of the likelihood polynomial, once filtered. Because the values are filtered and then sampled, the number of values subsequently used by which to calculate roots of the polynomial are significantly reduced, significantly reducing the computations required to calculate such roots.

In these and other aspects, therefore, apparatus, and an associated method, is provided for a communication system. The communication system has a receiving station operable to receive data communicated thereto. The data, when sent, exhibits an initial frequency. And, the data, when received at the receiving station, exhibits a receive frequency. Estimation of a frequency offset between the initial frequency and the receive frequency is facilitated. A filter is coupled to receive indications of the data received at the receiving station. The filter has a selected filter response. The filter filters the indications of the data to form filtered data therefrom. A down sampler is coupled to the filter to receive the filtered data formed thereat. The down sampler samples values of selected parts of the filtered data and forms a sampled representation thereof. The sampled representation is used to estimate the frequency offset.

A more complete appreciation of the present invention and to the scope thereof can be obtained from the accompanying drawings that are briefly summarized below. The following descriptions of the presently-preferred embodiments of the invention, and the appended claims.

DETAILED DESCRIPTION

Figure 1:
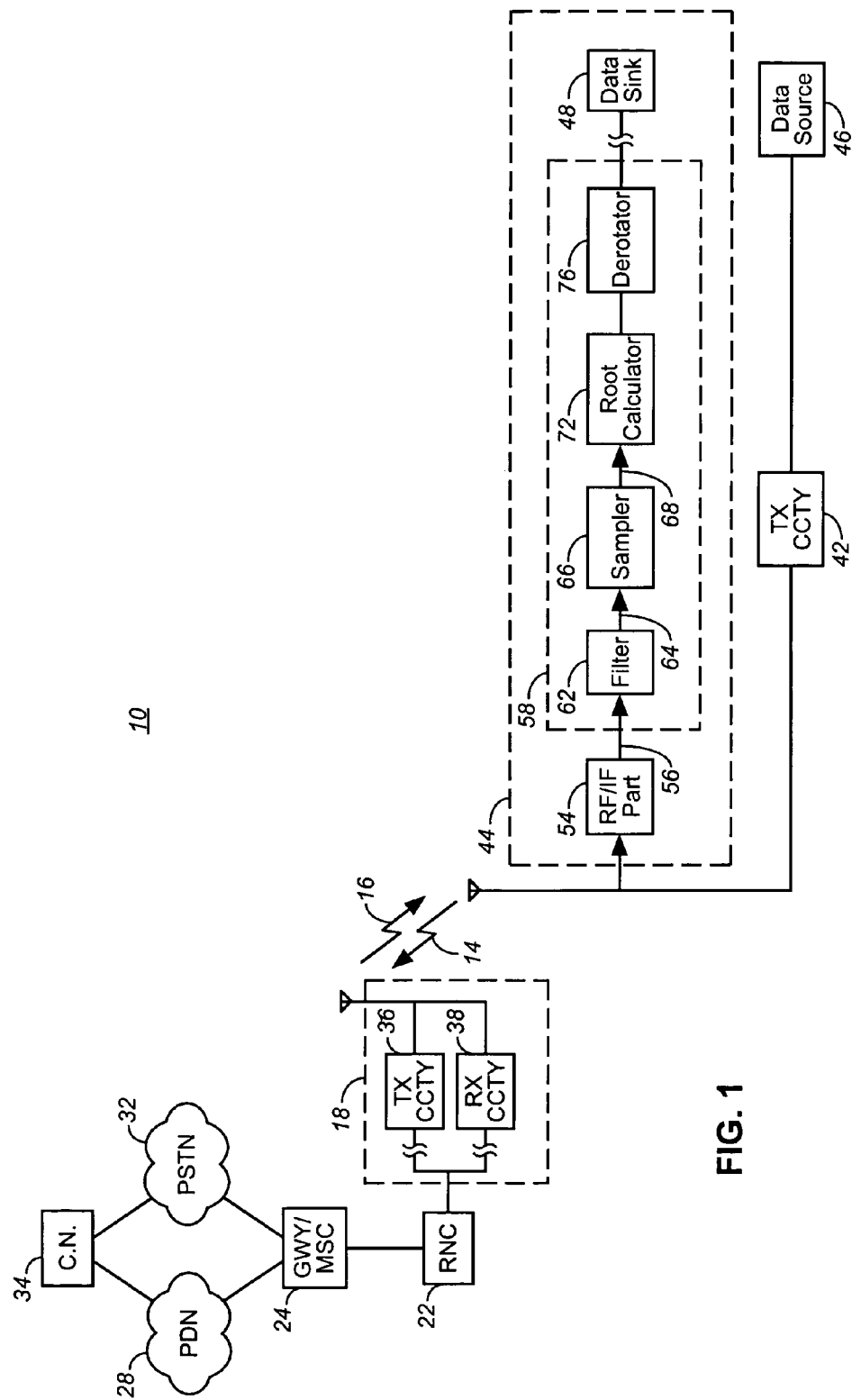
FIG. 1 illustrates a functional block diagram of a communication system in which an embodiment of the present invention is operable.

Referring first to FIG. 1, a radio communication system, shown generally at 10, provides for radio communications with a mobile station 12. In the exemplary implementation, the communication system forms a cellular communication system operable, generally, pursuant to a GSM/EDGE (global system for mobile communication/enhanced data for GSM evolution) operational specification. The teachings of the present invention are, however, also implementable in any of various other types of communication systems in which a set of data is communicated in which a polynomial is calculated. For instance, the teachings of the present invention are analogously also implementable in communication systems that utilize other communication schemes, such as an IS-95 (interim standard-95) or CDMA2000 (code-division, multiple-access2000) communication schemes. And, the communication stations shown in the figure are also representative of communication stations of wireline, or other, communication systems, and the teachings of the present invention are analogously also implementable in a conventional wireline communication scheme.

Accordingly, while the following description shall describe operation of an embodiment of the present invention with respect to its implementation in a GSM/EDGE communication system, the present invention is analogously also operable in other types of communication systems.

The mobile station 12 communicates by way of radio links with a network part of the communication system. The radio links are represented here by a reverse link 14 and a forward link 16. Radio channels are defined upon the reverse and forward links 14 and 16 to permit the effectuation of two-way communications with the mobile station.

The network part of the communication system includes a base transceiver station (BTS) 18. Both the base transceiver station and the mobile station form radio transceivers capable of transducing radio signals therebetween by way of the reverse and forward links of the radio link formed therebetween. The base transceiver station forms part of a radio access network part of the communication system. And, the radio access network part of the communication system is here further shown to include a radio network controller (RNC) 22. The radio network controller is coupled between the base transceiver station and a radio gateway (GWY) 24. The gateway forms a gateway with other parts of the communication system, here represented by a packet data network (PDN) 28 and a public-switched telephonic network (PSTN) 32. A correspondent node (CN) 34 is coupled to the networks 28 and 32 and is representative of a communication node with which communications are effectuable.

The base transceiver station 18 includes transmit circuitry 36 and receive circuitry 38 operable to transmit forward-link signals and to receive and operate upon reverse-link signals, respectively, during operation of the communication system.

The mobile station analogously includes both transmit circuitry 42 and receive circuitry 44, operable to transmit reverse-link signals and to receive and operate upon forward-link signals, respectively, generated during operation of the communication system. The mobile station includes a data source 46, coupled to the transmit circuitry and a data sink 48, coupled to the receive circuitry. The data source and data sink, respectively, source and sink data during operation of the communication system.

As noted previously, the base transceiver station and mobile station might operate at frequencies offset relative to one another. Such frequency offset might prevent recovery of the informational content of the transmitted data. To ensure better that the informational content of the communicated data is recovered, frequency control schemes are utilized to correct, or otherwise compensate, for the frequency offset.

In a GSM/EDGE system, training sequences are sent by the base transceiver station to the mobile station, to be used by the mobile station for frequency control purposes. Because the sequences are formed of twenty-six training symbols, computational complexity utilizing conventional frequency control schemes, namely a conventional MLE scheme, is so great as to prevent its practical implementation.

The receive circuitry 44 of the mobile station 12 includes an embodiment of the present invention to facilitate estimation of a frequency offset between the mobile station and the base transceiver station. Operation of an embodiment of the present invention is analogously implementable at a receive part of a base transceiver station, or otherwise, at any communication station that receives a set of data in which a polynomial needs to be calculated.

The receive circuitry 44 is here shown to include an RF/IF (radio frequency/intermediate frequency) part 54 that operates, amongst other things, to down-convert in frequency, from a radio frequency to a base band level, the data communicated thereto upon a forward link channel. Base band-level representations of the data received at the mobile station are generated on the line 56 and are applied to the apparatus 58 of an embodiment of the present invention.

The representations of the data formed on the line 56 are of values forming a polynomial, such as a likelihood polynomial. Conventional maximum likelihood estimation (MLE) processing techniques are unable quickly to perform the required number of computations to calculate the routes of the polynomial. The apparatus 58 of an embodiment of the present invention facilitates a reduction in the computational complexity of the calculations required to calculate the roots of the polynomial. And, in the exemplary implementation, the apparatus further forms a frequency offset estimate and compensates for the estimated offset.

The apparatus 58 includes a filter 62 coupled to the line 56 to receive the base band-level representations of the data formed by the RF/IF part 54. The likelihood polynomial is formed over the symbols at baseband at the RF/IF part. Filtering is performed subsequent to computation of the likelihood polynomial in the exemplary implementation. The MLE solution is not restricted by the type of filter used for downsampling and the optimality of the MLE estimation is preserved. A pre-processing step (61) is necessary to compute the likelihood polynomial from the baseband samples in (56) The filter is characterized by filter characteristics and exhibits a filter response of desired characteristics and operates to form a filtered signal on the line 64 formed of filtered representations of the data values applied on the line 56.

A sampler 66 is coupled to the line 64 to receive values of the filtered representations formed by the filter 62. The sampler operates to sample, at selected intervals, values of the filtered representations provided thereto. Sampled, filtered representations are generated on the line 68.

The line 68 extends to a root calculator/likelihood computer 72. The calculator/computer 72 operates to calculate the roots of the filtered, sampled representation of the polynomial provided thereto and, therefrom, performing a frequency offset estimation value on the line 74. The line 74 extends to a derotator 76. The derotator is also coupled to receive indications of the data received at the mobile station. The derotator functions to derotate the frequency-offset data to form derotated values on the line 78. That is to say, the derotator operates to compensate for the frequency offset. The derotated data is subsequently operated upon by other elements (not shown) of the received circuitry. And, thereafter, the data is provided to the data sink 48.

The apparatus 58 advantageously reduces the otherwise computationally-intractable number of roots that must be calculated in a conventional MLE solution in a GSM/EDGE system. Additionally, larger frequency offsets are able to be estimated as there is no "very small angle" assumption used in numerous alternative embodiments that limits the amount of frequency offset. For instance, if twenty-six EDGE training samples are used for frequency offset estimation, it is possible to solve for the roots of a likelihood polynomial a simple linear equation in one variable, i.e., no root finding for up to 4 kHz of frequency offset. This forms a very implementable solution as most EDGE systems, which anticipate frequency offsets of less than 1 kHz.

Figure 2:
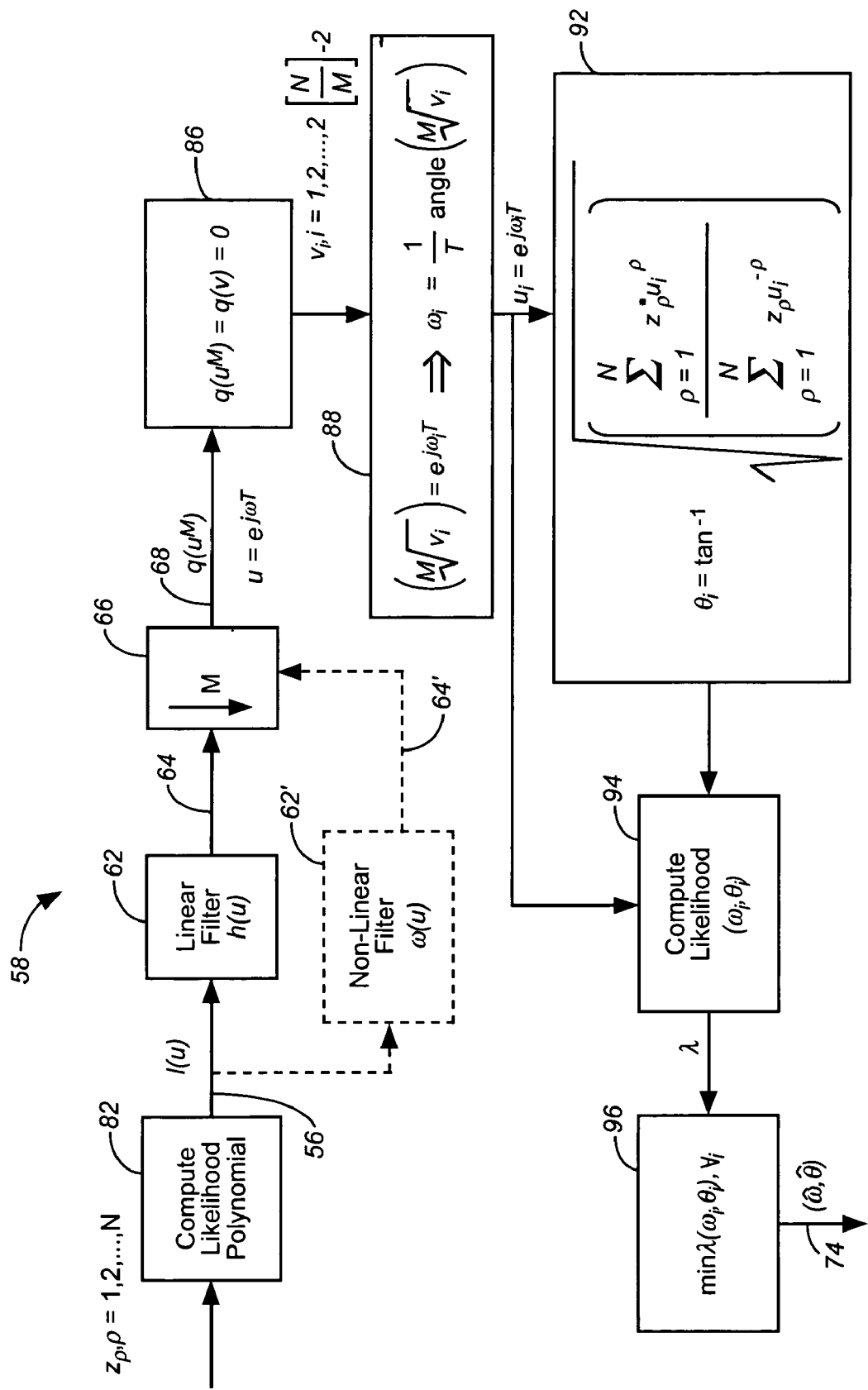
FIG. 2 illustrates a graphical representation of values of a likelihood polynomial, representative of received data, generated during operation of the communication system found in FIG. 1.

FIG. 2 illustrates, in greater detail, the apparatus 58 of an exemplary embodiment of the present invention. Here, a likelihood polynomial computer 82, that forms a portion of the RF/IF part 54 (shown in FIG. 1) generates the values of the likelihood polynomial that are generated on the line 56, here indicated by l(u), that are applied to the apparatus 58. Again, the line 56 extends to a filter 62. In one implementation, the filter forms a linear filter having characteristics h(u). And, in an alternate implementation, and as indicated by the block shown in dash, the filter forms a non-linear filter 62' having filter characteristics w(u). Filtered representations of the likelihood polynomial are generated on the line 64 (or 64') and applied to a decimator forming a down sampler 66. In the simplest embodiment of a decimator, the decimator samples every $m^{th}$ value applied thereto and generates a sampled representation on the line 68. The representation is represented as $q(w^M)$ The sampled, filtered values are provided to the root calculator/likelihood computer 72. Here, the calculator/computer is functionally represented by several functional blocks, blocks 86, 88, 92, 94, and 96 that perform the mathematical calculations described in the respective ones of the blocks to form an estimate of the frequency offset on the line 74. Once calculated, the values generated on the line 74 are provided to the derotator 76 (shown in FIG. 1).

Figure 3:
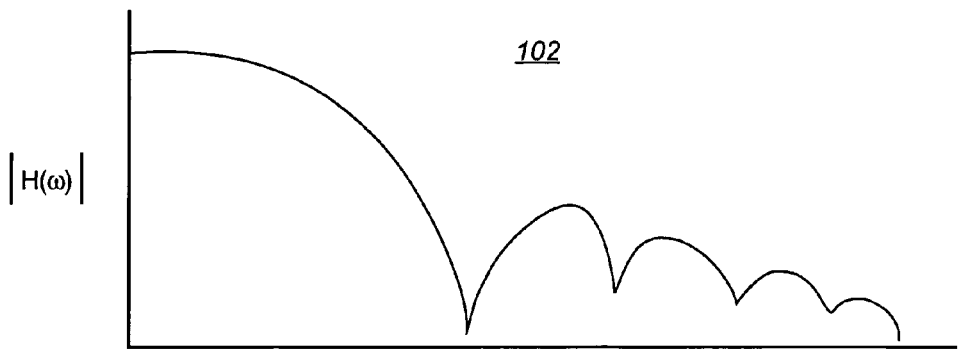
FIG. 3 illustrates a graphical representation of an exemplary filter forming a portion of an embodiment of the present invention.

FIG. 3 illustrates a graphical representation, shown generally at 102, of an exemplary likelihood polynomial generated on the line 56 and applied to the apparatus of an embodiment of the present invention. As indicated, the likelihood polynomial is a complex polynomial.

Figure 4:
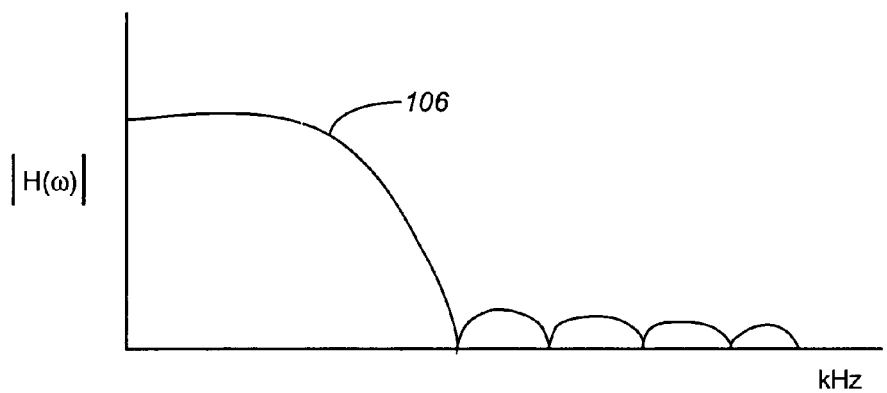
FIG. 4 illustrates a graphical representation representative of a filtered representation of the likelihood polynomial, shown in FIG. 2, subsequent to filtering thereof by the filter that exhibits the filter characteristics shown in FIG. 3.

FIG. 4 illustrates another graphical representation, shown generally at 106, representative of the filtered characteristics, h(u), plotted as a function of frequency of the filter 62. The filter forms a low pass filter. Here, the filter has a pass band of approximately 1 kHz. A nonlinear filter 62' (shown in FIG. 2), can alternately be represented by a characteristic curve.

Figure 5:
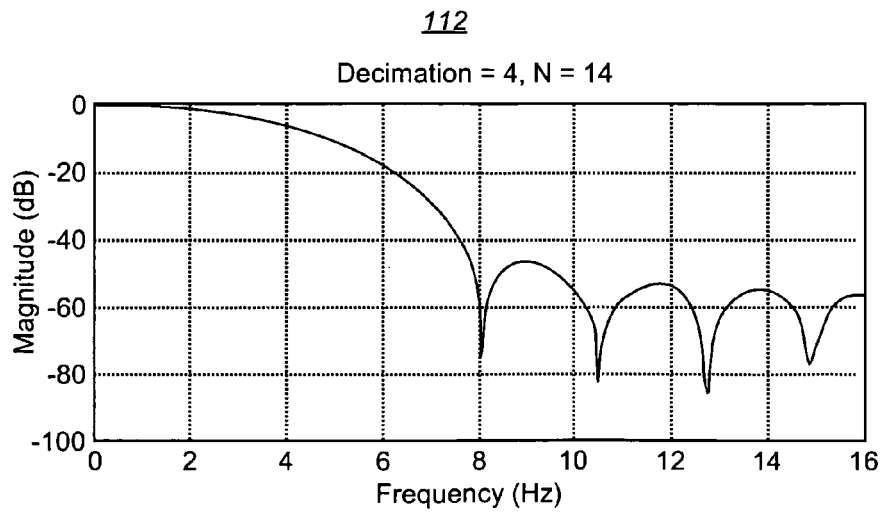
FIG. 5 illustrates a graphical representation of sampled values of the filtered representation of the likelihood polynomial generated by a decimator forming a portion of an embodiment of the present invention.

FIG. 5 illustrates another graphical representation, shown generally at 112, here representative of a decimated signal formed by the decimator 66 (shown in FIG. 2). The decimated, filtered signal is of lessened complexity relative to the likelihood polynomial 102 shown in FIG. 3. Root calculation operations performed on the decimated signal 112 are, accordingly, of lessened complexity relative to a brute force calculation of the likelihood polynomial 102.

A variant of an MLE (maximum likelihood estimation) approach to offset estimation reduces the complexity of root finding by filtering the input data or the likelihood polynomial of N samples, and decimating, i.e., down-sampling by keeping every $M^{th}$ sample, the filtered data, and performing generalized root-finding, if necessary, on a resulting lower-order likelihood polynomial. The lower-order likelihood polynomial is a N/M-T8 order polynomial. Root-finding complexity is further tailored to the maximum expected frequency offset that defines an un-aliased pass band of the filter.

Through selection of the filtering, and application of values thereto, it is possible to extend the frequency offset range of the estimations without increasing the complexity of the root finding by using aliased components of the frequency offset. Conversely, for an un-aliased embodiment, the amount of frequency offset is related to the bandwidth of the filter $f_{max}$ is less than or equal to $f_s/(2M)$ where $f_s$ is the sampling frequency of the system and M is the decimation factor subsequent to filtering.

In an exemplary implementation, the apparatus is implemented as software, or firmware, in a DSP chip in a communication station, here alternately, a mobile station or a base transceiver station. Depending upon the speed of the mobile station or expected maximum frequency offset along with the limits on computational complexity, the number of roots in the likelihood polynomial are selectable within the decimation factor.

Thereby, this approach towards AFC frequency offset estimation resurrects a frequency offset technique based upon a particular maximum likelihood estimation (MLE) formulation. Any approach provided for herein is similar to a maximum-aposteriori (MAP) estimator that theoretically provides better performance than a conventional MLE as statistical information regarding the frequency offset is exploited in the finding of a solution. Improved signal-to-noise ratio performance is also facilitated through operation of an embodiment of the present invention.

Figure 6:
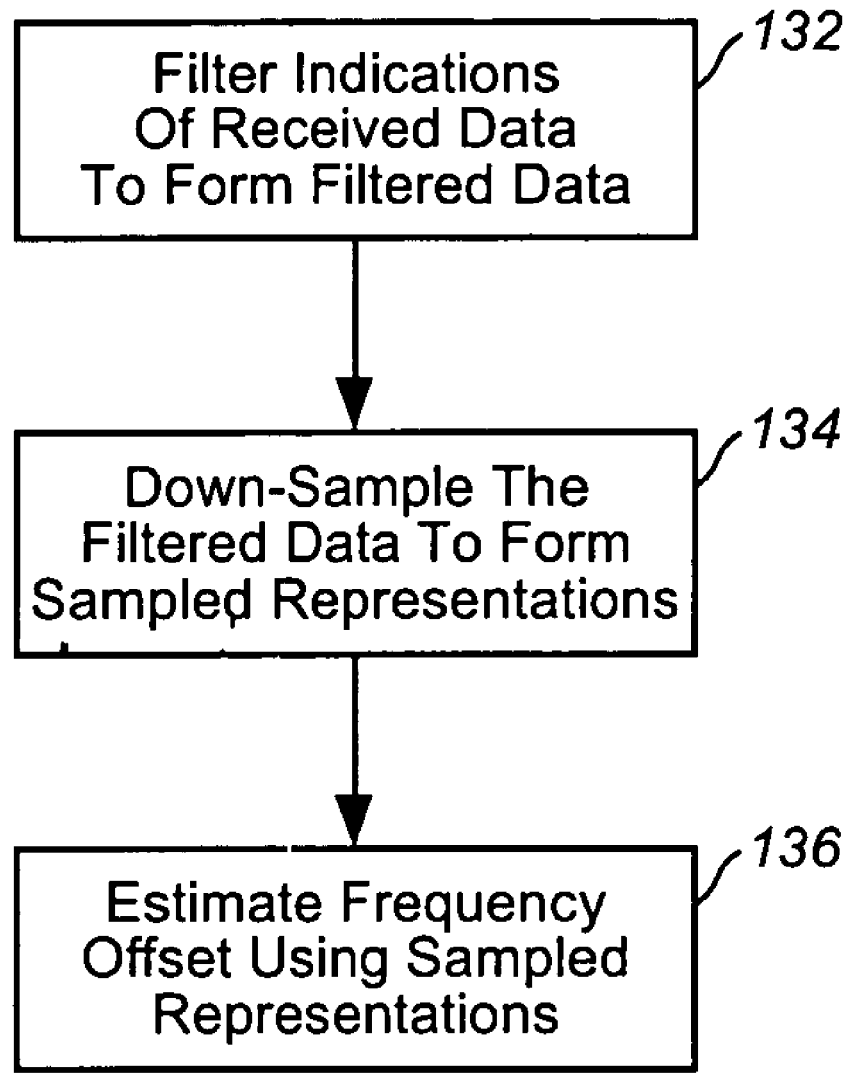
FIG. 6 illustrates a method flow diagram listing the method of operation of an embodiment of the present invention.

FIG. 6 illustrates a method, shown generally at 128, of the method of operation of an embodiment of the present invention. The method facilitates estimation of a frequency offset between an initial frequency and a receive frequency of data communicated by a sending station to a receiving station during operation of a communication system.

First, and as indicated by the block 132, indications of data received at a receiving station are filtered to form filtered data therefrom. Then, and as indicated by the block 134, the filtered data is down-sampled to form a sampled representation of the filtered data. And, as indicated by the block 136, the sampled representation is used to estimate the frequency offset.

Thereby, a manner is provided by which to reduce the complexity of computations required to calculate roots upon a polynomial used in the estimation of a frequency offset. Because of the reduced complexity of the computations, frequency offset estimation using MLE approaches is implementable in a GSM/EDGE communication system, or other appropriate communication system. Through filtering performed during operation of an embodiment of the present invention, either the input observations or the likelihood polynomial, a significant reduction of the order of likelihood polynomials is achieved. And, further, through the use of decimation filters that allow aliasing, the frequency offset is extendable beyond the passband of a down sampled signal. Reduced complexity realizations of MLE approaches are thereby provided.

The previous descriptions are of preferred examples for implementing the invention, and the scope of the invention should not necessarily be limited by this description. The scope of the present invention is defined by the following claims:

I claim:

1. In a communication system having a receiving station operable to receive data communicated thereto, the data, when sent, exhibiting an initial frequency, and the data, when received at the receiving station, exhibiting a receive frequency, an improvement of apparatus for facilitating estimation of a frequency offset between the initial frequency and the receive frequency, said apparatus comprising:

a likelihood polynomial processor to receive indications of the data received at the receiving station, and compute coefficients of said likelihood polynomial processor and a filter coupled to receive indications of the data received at the receiving station, said filter having a selected filter response, said filter for filtering the indications of the data to form filtered data therefrom; and a down sampler coupled to said filter, to receive the filtered data formed thereat, said down sampler for sampling values of selected parts of the filtered data and for forming a sampled representation thereof, the sampled representation used to estimate the frequency offset.

2. The apparatus of claim 1 further comprising a frequency offset estimate coupled to receive indications of the sampled representation formed by said down sampler, said frequency offset estimator performing responsive to values of the sampled representation, a frequency offset estimate.

3. The apparatus of claim 2 wherein the sampled representation defines a polynomial expression and wherein said frequency offset estimator comprises a root calculator for calculating root values of the polynomial expression defined of the sampled representation.

4. The apparatus of claim 3 wherein said frequency offset estimator further comprises a likelihood calculator coupled to said root calculator to receive indications of the root values calculated thereof, said likelihood calculator for selecting a selected one of the roots to identify the frequency offset estimate.

5. The apparatus of claim 4 further comprising a derotator coupled to receive the frequency offset estimate formed by said frequency offset estimator and to receive indications of the data received at the receiving station, said derotator for obtaining frequency characteristics of the data responsive to the frequency offset estimate.

6. The apparatus of claim 1 wherein the data is comprised of symbols selected from a constellation set and wherein the data applied to said filter is of symbol values rotated in frequency relative to the initial frequency.

7. The apparatus of claim 1 wherein the frequency offset between the initial frequency and the receive frequency is a time-invariant over the duration of the data payload value and wherein the sampled representation formed by said down sampler is time-invariant over the duration of the data payload.

8. The apparatus of claim 1 wherein said filter comprises a low pass filter that exhibits an upper cutoff frequency, the filter data exhibiting frequency characteristics below the upper cutoff frequency of the low pass filter.

9. The apparatus of claim 8 wherein the low pass filter forming said filter comprises a linear filter.

10. The apparatus of claim 8 wherein the low pass filter forming said filter comprises a non-linear filter.

11. The apparatus of claim 1 wherein said down sampler comprises a decimator.

12. The apparatus of claim 11 wherein said decimator samples values of the filtered data at selected intervals.

13. The apparatus of claim 12 wherein the selected intervals at which said decimator samples the filtered data at a rate to cause the sampled representation to contain a fewer numbers of values than the filtered data applied thereto within a selected time period.

14. The apparatus of claim 1 wherein the filter response of said filter causes the filtered data to exhibit aliasing.

15. The apparatus of claim 14 wherein the frequency response of the filter is defined by a filter passband and wherein the filtered data includes a component beyond the filter passband.

16. The apparatus of claim 1 wherein the communication system comprises a radio communication utilizing a phase-shift-hedging modulation scheme, wherein the receiving station comprises a radio communication device and wherein said filter and said down sampler are embodied at the radio communication device.

17. In a method of communicating in a communication system having a receiving station operable to receive data communicated thereto, the data, when sent, exhibiting an initial frequency, and the data, when received at the receiving station, exhibiting a receive frequency, an improvement of a method for facilitating estimation of a frequency offset between the initial frequency and the receive frequency, said method comprising:

likelihood polynomial computation using the date received at a receiving station to form a likelihood polynomial filtering indications of the data received processed into a likelihood polynomial to form filtered data therefrom;

down sampling the filtered data formed during said operation of filtering to form a sampled representation therefrom; and using the sampled representation to estimate the frequency offset.

18. The method of claim 17 wherein said operation of filtering comprises the operation of low-pass filtering the data.

19. The method of claim 18 wherein said operation of down sampling comprises decimating the filtered data.

20. The method of claim 17 wherein said operation of using the sampled representation comprises the operation of:

determining root values of the sampled representation;

selecting a selected root from the root values; and determining the frequency offset responsive to the selected root.

* * * * *